INVENTOR.
Richard C. Lemmon
BY
Eugene M. Whitacre
Attorney

United States Patent Office 3,428,857

Patented Feb. 18, 1969

3,428,857

STEP-RECOVERY DAMPER DIODE FOR RETRACE DRIVEN HORIZONTAL DEFLECTION CIRCUITS

Richard C. Lemmon, Indianapolis, Ind., assignor to Radio Corporation of America, a corporation of Delaware Filed Jan. 3, 1966, Ser. No. 518,388
U.S. Cl. 315—27 5 Claims
Int. Cl. H01j 29/72

ABSTRACT OF THE DISCLOSURE

A television type deflection waveform generating circuit employing a damping circuit which includes a step-recovery diode. The diode is coupled to the deflection winding and conducts throughout the trace interval with a portion of the deflection current passing through the diode in the reverse direction. A switch is closed during the retrace interval to supply energy to the circuit.

This invention relates to electromagnetic cathode ray beam deflection circuits of the type employed in television receivers and in particular to a horizontal deflection circuit employing a damper diode which is arranged to conduct throughout a substantial part of the trace portion of each deflection cycle.

While the present invention is useful in a variety of applications, it is particularly suitable for use in connection with a retrace driven horizontal deflection circuit of the types described in the copending applications for patent of John B. Beck entitled, "Electron Beam Deflection Circuit," Ser. No. 494,184, filed Oct. 8, 1965, and Gordon F. Rogers entitled, "Television Deflection Power Recovery Circuit," Ser. No. 507,797, filed Nov. 15, 1965, each of which are assigned to the same assignee as the present invention.

In general, the damper diode employed in a retrace driven horizontal deflection circuit is required to conduct for a substantial part, and in some instances throughout, the trace portion of each horizontal deflection cycle. Diodes commonly employed for this purpose exhibit a substantially unidirectional conduction characteristic. The direct current which flows through such a damper diode and, in most instances, through a transformer winding and other circuit components, associated therewith, results in the dissipation of a substantial amount of power in such circuits.

An object of the present invention therefore is to provide a horizontal deflection circuit including a damper diode wherein the DC power dissipation is reduced.

It is another object of the present invention to provide a retrace driven horizontal deflection circuit including a damper diode which conducts substantially throughout the trace portion of each deflection cycle wherein the direct current through such damper diode is reduced.

It is another object of the present invention to provide a horizontal deflection circuit employing a silicon controlled rectifier (SCR) and a bidirectionally conductive damper diode, the circuit being arranged for low power dissipation.

In accordance with a preferred embodiment of the invention, a television horizontal deflection circuit is provided with a damper diode which exhibits a relatively long charge storage time and a relatively short decay time. Such a diode is referred to as a "step-recovery" or "snap" diode and permits substantial reverse current conduction. The deflection circuit is arranged such that the damper diode conducts substantially throughout the trace portion of each deflection cycle, the diode conducting in the reverse direction near the end of the traces, the reverse current conduction serving to decrease the direct current flowing through the damper diode thereby improving circuit efficiency.

The novel features that are considered characteristic of this invention are set forth with particularity in the appended claims. The invention itself, however, both as to its organization and method of operation as well as additional objects and advantages thereof, will best be understood from the following description when read in connection with the accompanying drawing in which:

Figures 1, 2:
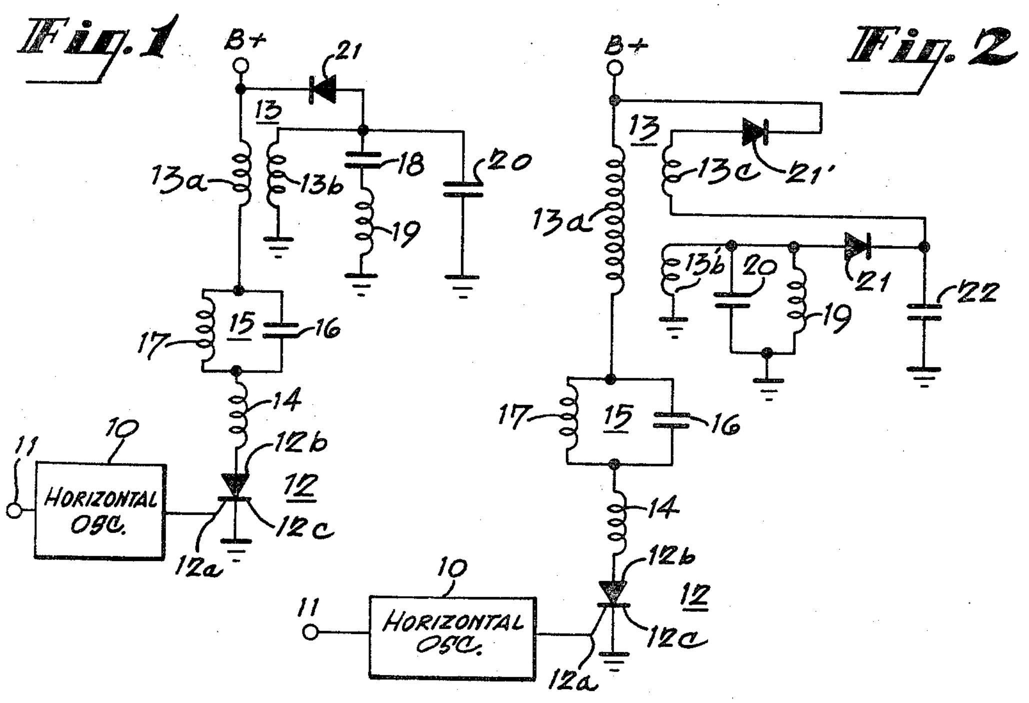
FIGURE 1 is a schematic circuit diagram, partially in block diagram form, of a first embodiment of the present invention in a television horizontal deflection circuit.
FIGURE 2 is a schematic circuit diagram, partially in block diagram form, of a second embodiment of the present invention in a television horizontal deflection circuit.

Referring to FIGURE 1, the deflection circuit includes a horizontal oscillator 10 to which synchronizing signals are applied at terminal 11. The output of oscillator 10 is applied to a horizontal deflection waveform generating circuit comprising a solid state current controlling or switching device such as a silicon controlled rectifier (SCR) 12. SCR 12 is provided with a gate-electrode **12*a*, to which the output of horizontal oscillator 10 is applied, an anode electrode 12*b*, and a cathode electrode 12*c*. Cathode electrode 12*c* is coupled to a reference voltage such as chassis ground. A direct B+ voltage supply (e.g., 140 volts) is coupled to anode electrode 12*b* by means of a series combination of energy storage components comprising primary winding 13*a* of a transformer 13, a first inductor 14, and a parallel resonant circuit 15 including an energy storage capacitor 16 and a second inductor 17. Transformer 13 further comprises a secondary winding 13*b*, one end of which is coupled to a reference voltage such as ground, while the opposite end thereof is coupled by means of an S-shaping capacitor 18 to one terminal of a horizontal deflection winding 19. The other terminal of deflection winding 19 typically is connected to ground. A retrace capacitor 20 is coupled across the combination of capacitor 18 and deflection winding 19. A damper diode 21 is coupled between the high voltage end of secondary winding 13*b*** and the B+ voltage supply.

The operation of the horizontal deflection circuit of FIGURE 1 constructed in accordance with the present invention will be described with reference to the waveforms shown in FIGURE 3.

Each deflection cycle may be considered as comprising a retrace portion (see in FIGURE 3 the time interval $t_0$ to $t_1$) and a trace portion ($t_1$ to $t_2$). Typically, the retrace portion is 10 microseconds in duration while the trace portion is approximately 53 microseconds in duration.

Energy is supplied from the B+ supply to the energy storage components 14, 16 and 17 by means of SCR 12 during the retrace portion, and where desirable, during the initial part of the trace portion of each deflection cycle (see waveform D representing SCR current). SCR 12 is turned on at the beginning of retrace by means of a pulse applied by horizontal oscillator 10 and subsequently is turned off, as is explained in the above mentioned Beck application, by means of the operation of energy storage components 14, 16, and 17. During retrace, energy also is transferred via transformer 13 to deflection winding 19 and retract capacitor 20 such that a sawtooth current (waveform F) is produced in deflection winding 19 during each deflection cycle. The sawtooth current is characterized by a relatively long duration, a substantially linear trace portion, and a relatively short duration, half-sinusoidal retrace portion. During the retrace portion of each deflection cycle, the current and voltage associated with deflection winding 19 undergo substantially one-half cycle of oscillation, the period of which is essentially determined by the resonant frequency of the combination of retrace capacitor 20 and deflection winding 19. The voltage across deflection winding 19 as well as that across damper diode 21 rises to a substantially negative value during this portion of the cycle (see waveform C). During the trace portion of each deflection cycle, the voltage across deflection winding 19 is maintained substantially constant by means of the connection of damper diode 21 to the positive voltage supply (see waveform C). The trace portion of the deflection cycle is characterized by a substantially linearly varying current flow in deflection winding 19. A major portion of the current which flows through deflection winding 19 during such trace portion of the deflection cycle also flows back through diode 21.

Figure 3:
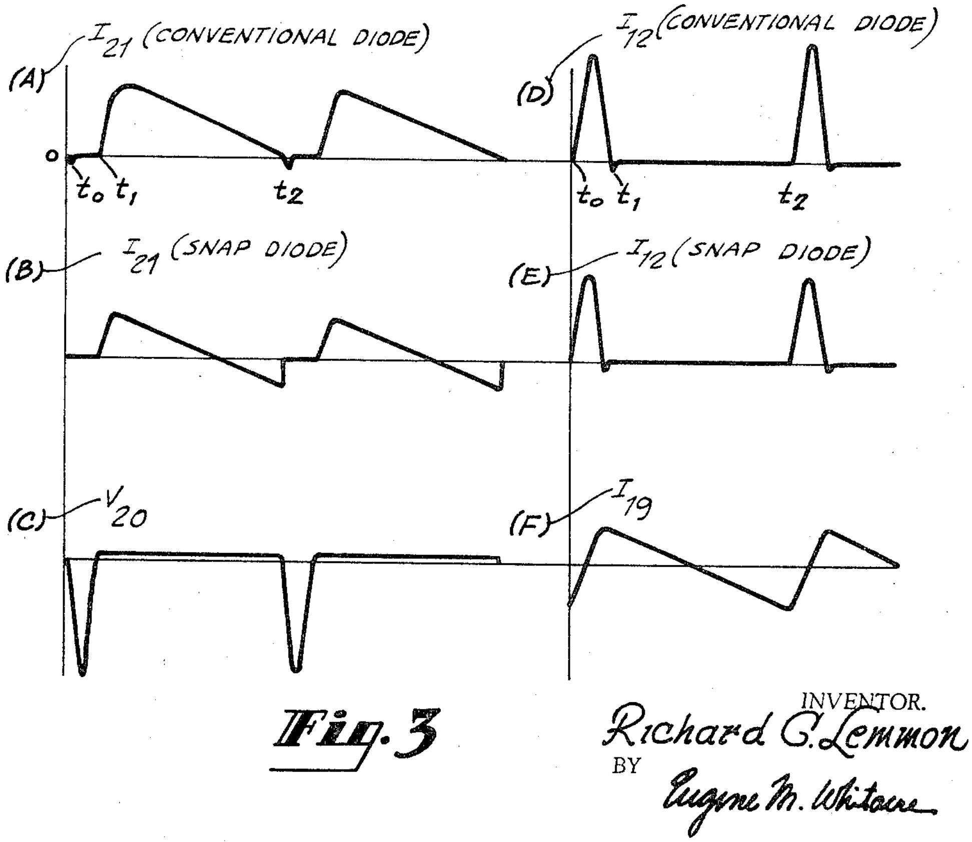
FIGURE 3 is a series of waveform diagrams to which reference will be made in the explanation of the circuits constructed in accordance with the present invention.

If damper diode 21 were a conventional, substantially unidirectionally conductive diode, the current through diode 21 would be characterized by a relatively high DC value (see FIGURE 3, waveform A). The peak value of current through diode 21 (shortly after time $t_1$) then would be only slightly less than twice the peak value of current which flows in deflection winding 19 (e.g., of the order of amperes).

In accordance with the present invention, damper diode 21 is a snap or step recovery diode which permits reverse current conduction during the diode "storage time" thereby substantially decreasing the DC value of the diode current (see waveform B) and thereby decreasing the power dissipated in diode 21 and transformer 13. Furthermore, as is shown in waveform E, the peak current in SCR 12 is substantially reduced (compare waveform D) when a step recovery diode 21 is utilized.

The operation of the step recovery diode 21 may be characterized as follows. When the diode conducts in the forward direction, it stores a charge the magnitude of which depends on the lifetime of the semiconductor material and the magnitude of the forward current. The current in deflection winding 19 reverses (waveform F) approximately at the midpoint of the trace portion of each deflection cycle, and, for the case shown in waveform C, shortly thereafter the diode 21 passes from forward conduction to reverse conduction. The reverse diode current continues to flow until all carriers stored in the diode are removed. The time required to remove all carriers is referred to as "storage time" and is a function of the initial charge stored, the diode lifetime and the magnitude of the reverse current. A storage time of anywhere from several microseconds up to approximately twenty-five microseconds provides the desired advantage in varying degrees. The diode 21 begins to turn off at the end of the storage time, the length of additional time required for conduction to decrease to zero being referred to as "decay time." The step recovery diode preferably is designed for a very short decay time (e.g., a fraction of a microsecond).

It is desirable, in accordance with the present invention, to provide a step recovery diode 21 having a very short decay time to reduce the possibility of continued reverse conduction into retract time (i.e., after $t_2$) since the voltage on the diode 21 (waveform C) reaches a substantial magnitude (e.g., of the order of 1000 volts) in a relatively short time during retrace. If the decay time is too long, substantial power may also be dissipated during retrace.

The step recovery diode 21 therefore preferably is selected to have a long storage time and a very short decay time. A typical step recovery diode which exhibits a characteristic of the type shown in waveform C is a General Electric type IN3670A.

In the embodiment of the invention shown in FIGURE 2, transformer 13 is provided with windings 13*b'* and 13*c* in the manner shown in the above-mentioned co-pending application of Gordon F. Rogers. Two step-recovery diodes 21 and 21' are provided with an additional energy storage capacitor 22 coupled to diode 21. In this embodiment of the invention, as is explained in the application of Rogers, the reverse voltage to which diodes 21 and 21' are subjected is substantially reduced as compared to the embodiment shown in FIGURE 1. In other respects, the operation of the embodiments of FIGURES 1 and 2 are similar. Either or both of diodes 21 and 21' may be step recovery diodes in order to realize the advantages of the present invention.

While the invention has been described in terms of embodiments utilizing silicon controlled rectifiers it may also be utilized in connection with other types of circuits such as those employing transistors.

What is claimed is:

1. In a television deflection circuit of the type in which a substantially sawtooth current waveform is caused to flow in an inductance, the combination with said inductance of a current controlling device for controlling transfer of energy to said inductance,
- a voltage supply to which said controlling device is coupled for transferring energy to said inductance, and
- a rectifier damping circuit coupled to said inductance, said damping circuit including a step-recovery diode exhibiting a bidirectional conduction characteristic having a relatively long storage time and a relatively short decay time, said damping circuit being coupled between said inductance and said voltage supply.

2. In a television deflection circuit of the type in which a substantially sawtooth current waveform is caused to flow in an inductance, the combination with said inductance of a current controlling device for controlling transfer of energy to said inductance wherein said current controlling device is arranged to conduct substantially throughout the retrace portion of each deflection cycle and,
- a rectifier damping circuit coupled to said inductance, said damping circuit including a step-recovery diode exhibiting a bidirectional conduction characteristic having a relatively long storage time and a relatively short decay time wherein said step recovery diode is arranged to conduct said sawtooth current substantially throughout the trace portion of each deflection cycle, the conduction of said diode being in a reverse direction during the latter half of said trace portion.

3. The combination according to claim 2 wherein said current controlling device is a silicon controlled rectifier.

4. The combination according to claim 3 and further comprising a transformer having a primary winding coupled in series relation with said supply and said silicon controlled rectifier, said transformer further having at least one secondary winding across which said inductance is coupled in energy transfer relationship,
- said step-recovery diode being coupled between said one secondary winding and said supply for returning energy to said supply from said inductance.

5. The combination according to claim 4 and further comprising
- a second secondary winding, and
- a second damper diode coupled in series relation with said step-recovery diode between said inductance and said supply.

References Cited

UNITED STATES PATENTS 2,933,642 4/1960 Marley ------------ 315—27

RODNEY D. BENNETT, *Primary Examiner.*

J. G. BAXTER, *Assistant Examiner.*